United States Patent [19]
Lee

[11] Patent Number: 5,362,091
[45] Date of Patent: Nov. 8, 1994

[54] REAR SUSPENSION FOR VEHICLE

[75] Inventor: Unkoo Lee, Kyungki, Rep. of Korea

[73] Assignee: Hyundai Motor Company, Seoul, Rep. of Korea

[21] Appl. No.: 997,919

[22] Filed: Dec. 29, 1992

[30] Foreign Application Priority Data

Dec. 30, 1991 [KR] Rep. of Korea .................... 91-25209

[51] Int. Cl.⁵ ............................................... B60G 3/14
[52] U.S. Cl. .................................. 280/662; 267/141.1; 267/279; 267/281; 280/660; 280/666; 280/673; 280/690; 280/697; 280/698
[58] Field of Search ............... 280/690, 688, 697, 698, 280/701, 660, 662, 663, 666, 670, 673; 267/141.1, 141.2, 141.3, 141.4, 141.5, 245, 258, 276, 279, 280, 281, 282

[56] References Cited

U.S. PATENT DOCUMENTS

| | | | |
|---|---|---|---|
| 4,634,108 | 1/1987 | Munch | 267/279 |
| 4,807,901 | 2/1989 | Kondo | 280/701 |
| 4,844,505 | 4/1989 | Higuchi | 280/663 |
| 4,966,385 | 10/1990 | Iwasaki et al. | 280/698 |
| 4,998,748 | 3/1991 | Kashiwagi et al. | 280/701 |
| 5,102,159 | 4/1992 | Sato et al. | 280/663 |

FOREIGN PATENT DOCUMENTS

| | | | |
|---|---|---|---|
| 3243981 | 5/1984 | Germany | 267/281 |
| 3346665 | 7/1985 | Germany | 280/673 |
| 3517168 | 3/1986 | Germany | 280/673 |

*Primary Examiner*—Eric Culbreth
*Attorney, Agent, or Firm*—Birch, Stewart, Kolasch & Birch

[57] ABSTRACT

A rear suspension for a vehicle includes a sub-frame having projections to a rear and on both ends of the sub-frame, coupling portions are formed on front and rear sides of the projections for connecting the sub-frame to a car body. Front and rear lower links are transversely arranged with respect to the car body and each include a car body side coupling portion coupled to outer end of the sub-frame and a wheel side coupling portion coupled to a knuckle arm rotatably supporting a wheel with respect to the car body. A connecting arm projects upwardly from and has an inner side lower end coupled to the car body and an outer side lower end coupled to the knuckle arm. An upper arm is coupled to an upper end of the connecting arm and cooperates therewith for enabling the wheel to move up and down with respect to the car body. A trailing arm is longitudinally arranged at a front side of the knuckle arm, and has a front end coupling portion including rubber stoppers having different spring characteristics from each other inserted therein and coupled to the car body to achieve a toe control of the wheel when the longitudinal force is applied to the wheel. A rear end coupling portion is coupled to the knuckle arm for enabling the wheel to move up and down on the basis of the front end coupling portion. A strut assembly absorbs an impact caused when the wheel moves up and down.

7 Claims, 4 Drawing Sheets

REAR SUSPENSION FOR VEHICLE

BACKGROUND OF THE INVENTION

1. Field of the Invention

The present invention relates to a rear suspension for a vehicle having a sub-frame and more particularly, to a rear independent suspension which is capable of toe-control by a front arm and the sub-frame independently when a transverse and longitudinal force with respect to the vehicle are applied to the wheel, thereby improving ride comfort and handling safety, and at the same time being variably and easily designed.

2. Description of Conventional Art

A suspension for a vehicle connects an axle shaft and a car body to each other, and controls a position of a tire with respect to the car body for its ideal position during running, of a vehicle thereby obtaining optimal handling safety, preventing the axle shaft from directly transmitting an impact or vibration from the road surface to the car body, preventing damage of baggage, and improving the ride comfort.

Accordingly, the connection of the upper and lower portions of the suspension has to be flexible for absorbing the impact from the road surface and be durable to overcome a driving force, a braking force, and a centrifugal force applied to the wheel.

Such suspensions described above can be variably classified according to the characteristics of their structures. The suspension according to the present invention relates to a link type rear suspension, which is provided with a sub-frame and a plurality of control links.

FIGS. 6A and 6B are plan views of the conventional link type suspension comprising a sub-frame mounted on a lower portion of the car body, a plurality of control links for connecting the sub-frame to a wheel supporter, so that each wheel can independently move up and down, and a strut assembly having a lower end fixed to a knuckle arm and an upper end connected to the car body.

More specifically, the sub-frame 50 is coupled to the car body (not shown) by means of coupling portions 52a and 52b formed on a front end of a projection 51 projected in a forward direction on opposing ends of the sub-frame 50.

Inner ends of center and lower links 53 and 54 which are transversely arranged with respect to the car body and spaced from each other by a predetermined distance are respectively connected to a side-rear portion of the sub-frame 50. A knuckle arm 56 is connected to outer-ends of the center and the lower links 53 and 54.

A front end of a trailing arm 57 longitudinally arranged with respect to the car body is coupled to the front end of the projection 51 of the sub-frame 50, and a rear end of the trailing arm 57 is coupled to the knuckle arm 56.

Accordingly, in case a longitudinal force caused by the driving force and the braking force of the vehicle and the transverse force caused by a turning movement of the vehicle are applied to the car body, toe control is achieved by a compliance of a rubber bushing at ends of links 53, and 54 and trailing arm 57 and an arranging state of each element 53, 54, and 57.

That is, in case a longitudinal force is applied to the wheel 55, the sub-frame 50 is designed to be applied with a pulling load F caused by the longitudinal force of the wheel, thereby pulling the front portion of the projection 51 toward the wheel as shown in FIG. 6A, and in case a transverse force is applied to the wheel, the center and rear links 53 and 54 are designed to be applied with a pushing load P toward the car body caused by the transverse force, whereby the rear portion of the projection 51 is deformed as shown in FIG. 6B.

However, in such a conventional suspension, if deformation of the sub-frame is caused by the longitudinal force, the toe change occurs at both wheels of the vehicle, thereby providing a bad effect to the straight ahead position, and if the transverse force is applied to the wheel at the turning movement and the straight ahead position, the toe change occurs in an unstable car body so that the handling safety cannot be obtained.

SUMMARY OF THE INVENTION

Therefore, the present invention has been made in an effort to solve the above-described problems of the conventional suspension.

The primary object of the present invention is to provide a suspension which is capable of toe-control independently when longitudinal and transverse forces are applied to a wheel.

Another object of the present invention is to provide a suspension which can improve a ride comfort and a handling safety.

Still a further object of the present invention is to provide a suspension which can be obtained variably and easily.

To achieve the above objects, a rear suspension for a vehicle according to the present invention comprises a sub-frame having a projection in a rearward direction of the vehicle on opposing ends of the sub-frame; front and rear lower links which are transversely arranged with respect to the car body, each of the front and rear lower links having a coupling portion close to an outer end of the sub-frame and a coupling portion close to a wheel coupled to a knuckle arm rotatively supporting the wheel, thereby enabling the wheel to move up and down with respect to the car body; a connecting arm protecting upwardly from the knuckle arm and having an inner-lower end coupled to the car body and an outer-lower end coupled to the knuckle arm; an upper arm coupled to an upper end of the connecting arm and cooperating therewith for the wheel to move up and down with respect to the car body; a trailing arm longitudinally arranged at a front portion of the knuckle arm, and having a front end coupling portion in which rubber stoppers respectively having a different spring characteristic therein and coupled to the car body to achieve a toe control of of the wheel when a longitudinal force is applied to the wheel and a rear end coupling portion coupled to the knuckle for the wheel to move up and down in response to movement of the front end coupling portion; and a strut assembly formed by unifying a shock absorber and a coil spring, and having a lower end coupled to the inner-lower end of the connecting arm to absorb an impact caused when the wheel moves up and down.

The above and further objects, details and advantages of the present invention will become apparent from the following detailed description of a preferred embodiment thereof, when read in conjunction with the accompanying drawings.

DETAILED DESCRIPTION OF PREFERRED EMBODIMENTS

Figure 1:
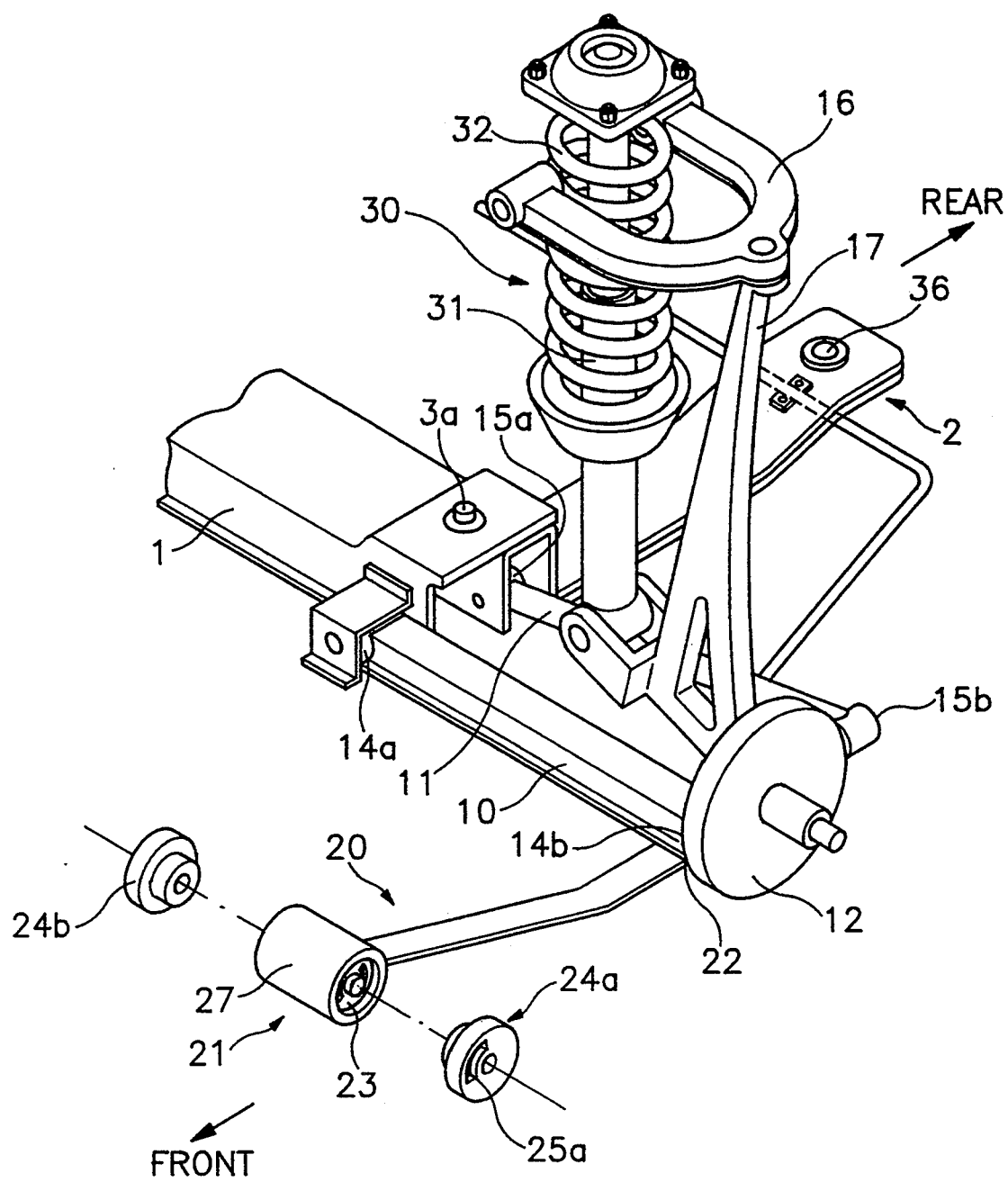
FIG. 1 is a perspective view of a rear suspension according to the present invention.
Figure 2:
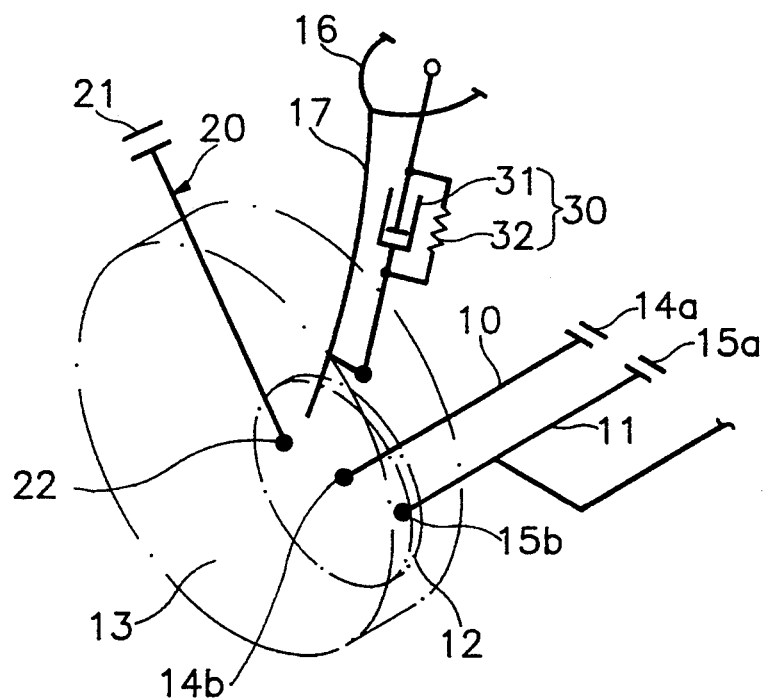
FIG. 2 is a schematic diagram of the suspension illustrated in FIG. 1.

FIG. 1 is a perspective view of a rear suspension according to the present invention. In this figure, the arrow marked by "FRONT" indicates the forward direction of the vehicle, and the arrow marked by "REAR" indicates the rearward direction of the vehicle.

The rear suspension of the present invention comprises a sub-frame 1 mounted on a lower portion of a car body (not shown), front and rear lower links 10 and 11 which connect the sub-frame to a knuckle arm 12 so that wheels 13 can independently move up and down, a trailing arm 20 which is longitudinally arranged with respect to the car body at a front portion of the knuckle arm 12, and a strut assembly 30 which absorbs the impact transmitted from the wheel 13.

A projection 2 is formed on both rear end portions of the sub-frame 1 and projected to a rearward direction, and coupling portions 3a and 3b are formed on front and rear portions of the projection 2 for coupling the projection to the car body.

Further, the coupling portions 3a and 3b are formed on the protruding portion of the sub-frame 1, so that the sub-frame 1 and car body can be spaced with respect to each other, when the sub-frame 1 is mounted on the car body.

The front and rear lower links 10 and 11 are spaced with respect to each other and are transversely arranged with respect to the car body at the front portion of the projections 2 of the sub-frame 1. The front and rear lower links 10 and 11 respectively have coupling portions 14a and 15a which are coupled to the outer end of the sub-frame 1 mounted on the car body and coupling portions 14b and 15b which are coupled to the knuckle arm 12 rotatively supporting the wheel 13.

To couple the front and rear lower links 10 and 11 to the sub-frame 1 and knuckle arm 12, rubber bushings and ball joints are used.

However, a rubber bushing is generally used for the coupling portions 14a and 15a which are coupled to the outer end of the sub-frame 1 mounted on the car body, and a ball joint is generally used for the coupling portions 14b and 15b which are coupled to the knuckle arm 12 rotatively supporting the wheel 13, thereby enabling the wheel 13 to move up and down.

Further, the front and rear lower links 10 and 11 can be made of a hollow tube or a non-hollowed cylindrical member. However, it is preferable to use the hollow tube for reducing the vehicle's weight.

The trailing arm 20 is longitudinally arranged with respect to the car body and at the front portion of the knuckle arm 12 has a front end coupling portion 21 and a rear end coupling portion 22. The front end coupling portion 21 is coupled to the car body, and the rear end coupling portion 22 is coupled to the knuckle arm 12, so that the wheel can move up and down on the axis of the front end coupling portion 21.

The front and the rear ends of the trailing arm 20 are respectively coupled to the car body and the knuckle arm 12 by an elastic bushing or ball joint. In the present invention, as shown in an enlarged sectional view of FIGS. 3A and 3B, the front end coupling portion 21 of the trailing arm 20 is coupled to the car body by rubber bushing 23, and rubber stoppers 24a and 24b are respectively inserted at both sides of the rubber bushing, and the front and the rear portions of each stopper 24a and 24b have different spring characteristics from each other, such that toe-control is achieved when longitudinal force is applied to the wheel 13.

Figure 4A:
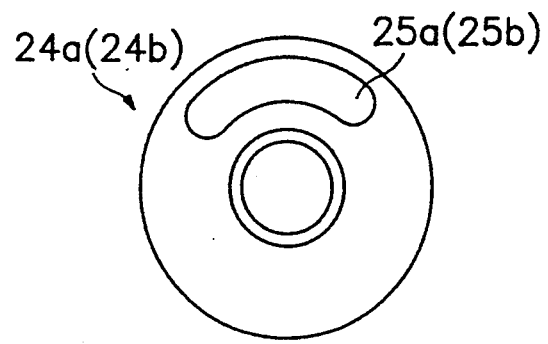
FIGS. 4A and 4B are sectional views of variable types of a stopper which are applied to the present invention.

That is, to provide the different spring characteristics with the front and the rear portions of each rubber stopper 24a and 24b, each rubber stopper is ring-shaped with arc-shaped holes 25a and 25b formed therein as shown in FIG. 4A, so that a portion forming the arc-shaped holes has a more flexible spring characteristic than the other portion which is not forming the arc-shaped hole.

More in detail, when of the rubber stoppers 24a and 24b are inserted between an inner tube 26 and an outer tube 27, the stopper 24a close to the wheel is inserted for the arc-shaped hole to be located in the forward direction whereby the spring characteristics of the front portion of the rubber stopper 24a becomes more flexible, and the rubber stopper 24b close to the car body is inserted for the arc-shaped hole to be located in the rearward direction whereby the spring characteristics of the rear portion of the rubber stopper 25 becomes more flexible. That is, the spring characteristic of the rubber stopper 24a is of a diagonal compared to that of the rubber stopper 24b.

Figure 4B:
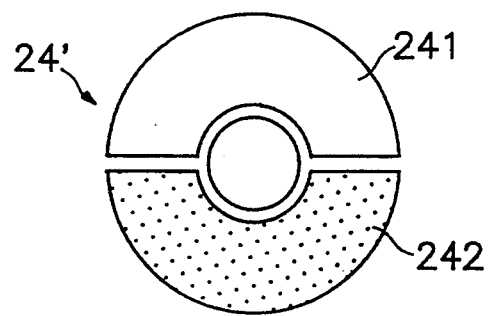

The means for forming a different spring characteristics is not limited to an arc-shaped hole. The stopper 24' made by unifying a member 241 having a flexible spring characteristic and another member 242 having a hard spring characteristic as shown in FIG. 4B can also be used.

A strut assembly 30 formed by unifying a shock absorber 31 and a coil spring 32 has a lower end connected to an inner-lower end of a connecting arm 17 upwardly projected from an inner-lower upper end of the knuckle arm 12 and having an upper end connected to an upper arm 16, thereby absorbing and reducing the impact caused when the wheel moves up and down according to the conditions of the road surface.

In the suspension described above, when the impact from the road surface is inputted into the wheel, the wheel 13 is designed to move up and down by the operation of the trailing arm 20, the front lower link 10, the rear lower link 11 and the upper arm 16, and at the same time, the impact is absorbed and reduced by the strut assembly 30. At this point, if longitudinal force is applied to the wheel, the toe control is achieved at front end coupling portion of the trailing arm 20, and if transverse force is applied to the wheel 13, toe control is realized at the sub-frame 1.

More in detail, in case longitudinal force is applied to the wheel 13, the trailing arm 20 is pushed to the rearward direction, and at the same time, an outer tube 27 of the front end coupling portion 21 of the trailing arm 20 receives a pulling force in the rearward direction.

Figure 3A:
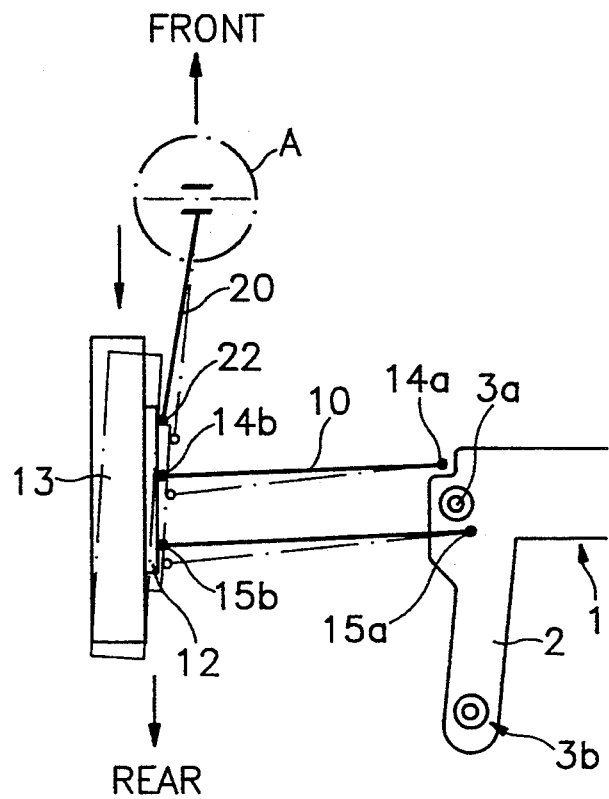
FIG. 3A is a plan view showing an operating state of a rear lower link according to the present invention.
Figure 3B:
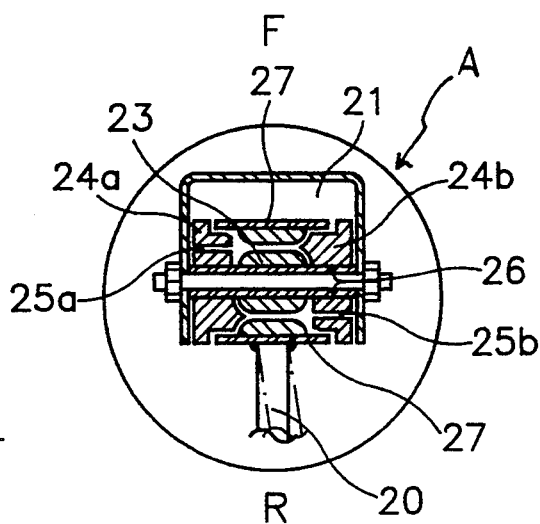
FIG. 3B is an enlarged portion of FIG. 3A.

In the above case, since the rubber stopper 24a close to the wheel, which is inserted between the outer tube 27 and inner tube 26 of the coupling portion 21, has the flexible spring characteristics on its front portion, and the rubber stopper 24b close to the car body, which is also inserted between the outer tube 27 and inner tube 26 of the coupling portion 21, has the flexible spring characteristics on its rear portion, as shown in FIG. 3B, the front portion of the outer tube 27 is inclined toward the wheel, and at the same time, the front lower link 10 having a relatively short length is turned with a short radius, and the trailing arm 20 having a relatively long length is turned with a large radius, so that the rear end of the trailing arm 20 is pulled to the rearward direction and at the same time, inclined toward the car body.

As shown in broken line of FIG. 3A, when the rear end of the trailing arm 20 is pulled to the rearward direction and inclined toward the car body, the wheel 13 is changed into a toe-in state, and when the longitudinal force caused by a braking and an abrupt start is applied to the wheel, the wheel can become pliable with respect to the longitudinal force so that safe handling can be realized.

Further, in case the transverse force caused by the vehicle's turning movement or the transverse wind is applied to the wheel 13, the force is transmitted to the sub-frame 1 through the front lower arm 10 and rear lower arm 11.

In the above case, the sub-frame 1 is designed to be applied with the pulling force on its front side. At this point, if the pulling force is below a spring constant of the rubber bushing formed on the coupling portion 3a and 3b, it is absorbed by the spring characteristic of the rubber bushing, while maintaining the transverse rigidity.

Figure 5:
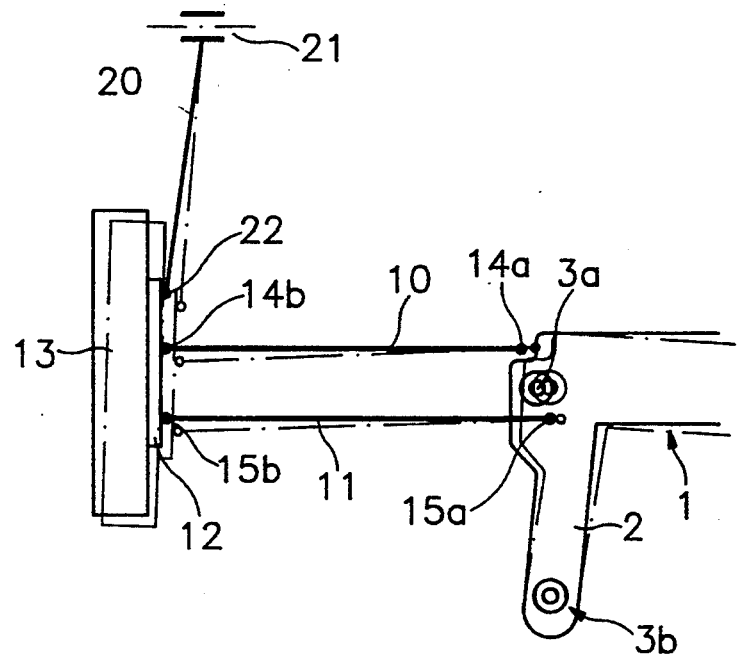
FIG. 5 is a plan view showing an operating state of a sub-frame according to the present invention.
Figure 6A:
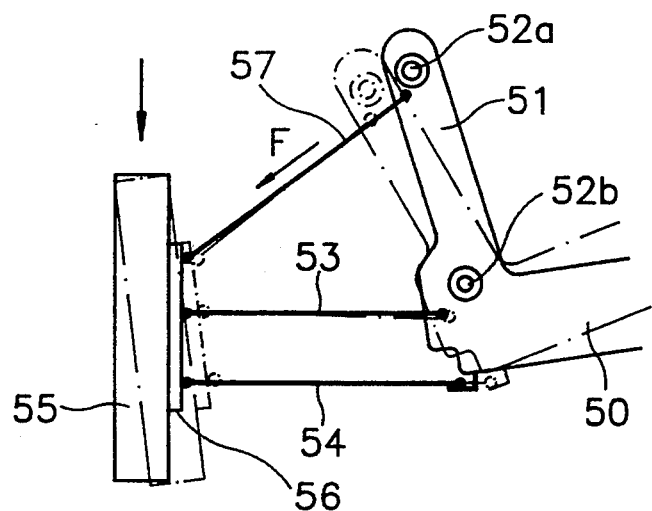
FIG. 6A is a plan view showing an operating state of a conventional suspension when a longitudinal force is applied to the wheel.
Figure 6B:
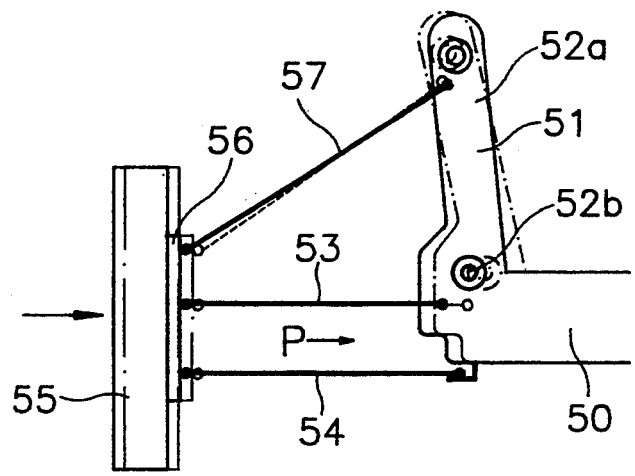
FIG. 6B is a plan view showing an operating state of the conventional suspension when a transverse force is applied to the wheel.

However, if the pulling force applied to the sub-frame 1 through the front lower link 10 and rear link 11 is beyond the spring constant of the rubber bushing formed on the coupling portions 3a and 3b, as shown in the broken line of FIG. 5, the front portion of the sub-frame 1 is deformed inwardly on the axis of the rear coupling portion 3b, and at the same time, the wheel 13 is changed into a toe-in state by the deformation of the sub-frame 1 as shown in broken line, such that when the vehicle is in a turning movement, handling safety is improved.

As described above, in the present invention, in case longitudinal force is applied to the wheel 13, the toe state of the wheel 13 is controlled at the front end coupling portion 21 of the trailing arm 20, and in case transverse force is applied to the wheel 13, the toe state of the wheel is controlled by the deformation of the sub-frame 1, such that the toe control is independently realized according to the loads applied to the wheel 13 such that the ride comfort and the handling safety can be improved.

Further, since the toe state of the wheel 13 is controlled by the deformation of the front end coupling portion 21 of the trailing arm 20 and the sub-frame 1, the optimized toe control according to the running condition can be obtained by the simple changing of the construction and materials, thereby being designed variably and easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear suspension for a vehicle including a car body comprising:

a sub-frame having a projection in a rearward direction of the vehicle and extending from the sub-frame;

front and rear lower links spaced with respect to each other and transversely arranged with respect to the car body, each of said front and rear lower links having a coupling portion close to an outer end of the sub-frame and a coupling portion close to a wheel coupled to a knuckle arm rotatably supporting the wheel, thereby enabling the wheel to move up and down with respect to the car body;

a connecting arm projecting upwardly from the knuckle arm, said connecting arm having an inner-lower end coupled to the car body and an outer-lower end coupled to the knuckle arm;

an upper arm coupled to an upper end of the connecting arm and cooperating therewith for the wheel to move up and down with respect to the car body;

a trailing arm longitudinally arranged with respect to the car body at a front portion of the knuckle arm having a front end coupling portion in which rubber stoppers respectively having front and rear portions having a different spring characteristic from each other are inserted, and coupled to the car body to achieve a toe control of the wheel when a longitudinal force with respect to the car body is applied to the wheel and a rear end coupling portion coupled to the knuckle arm for the wheel to move up and down in response to movement of the front end coupling portion; and a strut assembly formed by unifying a shock absorber and a coil spring, and having a lower end coupled to the inner-lower end of the connecting arm to absorb an impact caused when the wheel moves up and down.

2. The rear suspension for a vehicle as claimed in claim 1, wherein the coupling portion adjacent to the car body of the rear lower link is coupled to the sub-frame by a rubber bushing, and the coupling portion of the rear lower link close to the wheel is coupled to the knuckle arm by a ball joint.

3. The rear suspension for a vehicle as claimed in claim 1 or claim 2, wherein one of said rubber stoppers is close to the wheel and is inserted for the spring characteristic of a front portion of the rubber stopper to be flexible, and another of said rubber stoppers is close to the car body and is inserted for the spring characteristic of the rear portion of the rubber stopper to be flexible, so that the spring characteristic of the rubber stopper close to the wheel is of a diagonal to that of the rubber stopper close to the car body.

4. The rear suspension for a vehicle as claimed in claim 1, wherein the coupling portion, adjacent to the car body of the front lower link is coupled to the sub-frame by means of a rubber bushing, and the coupling portion of the front lower link adjacent to the wheel is coupled to the knuckle arm by a ball joint.

5. The rear suspension for a vehicle as claimed in claim 1, wherein each rubber stopper is formed with a ring-shape, and the rubber stopper is formed by two portions of a half-circle shape, one portion having a flexible spring characteristic and the other portion having a hard spring characteristic.

6. The rear suspension for a vehicle as claimed in claim 5, wherein at least one of said rubber stoppers is made by unifying a flexible material and a hard material for providing the flexible spring characteristic on its one side.

7. The rear suspension for a vehicle as claimed in claim 1, wherein each rubber stopper is formed with a ring-shape, and the rubber stopper is formed of two-half-circle shapes, a portion of the two portions forming an arc-shaped hole for a flexible spring characteristic.

* * * * *